United States Patent
You et al.

(10) Patent No.: US 12,050,350 B2
(45) Date of Patent: Jul. 30, 2024

(54) SEMICONDUCTOR PACKAGE STRUCTURE AND METHOD OF MANUFACTURING THE SAME

(71) Applicant: Advanced Semiconductor Engineering, Inc., Kaohsiung (TW)

(72) Inventors: Chang-Feng You, Kaohsiung (TW); Yu-Yuan Yeh, Kaohsiung (TW); Jun-Wei Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 267 days.

(21) Appl. No.: 17/364,431

(22) Filed: Jun. 30, 2021

(65) Prior Publication Data
US 2023/0003956 A1 Jan. 5, 2023

(51) Int. Cl.
*G02B 6/42* (2006.01)

(52) U.S. Cl.
CPC ......... *G02B 6/4225* (2013.01); *G02B 6/4239* (2013.01); *G02B 6/4245* (2013.01)

(58) Field of Classification Search
CPC ... G02B 6/4225; G02B 6/4239; G02B 6/4245
See application file for complete search history.

(56) References Cited

U.S. PATENT DOCUMENTS 8,710,518 B2 * 4/2014 Mandlik ............. H10K 77/111
257/40

* cited by examiner

*Primary Examiner* — John Bedtelyon
(74) *Attorney, Agent, or Firm* — FOLEY & LARDNER LLP

(57) ABSTRACT

A semiconductor package structure and a method of manufacturing the same are provided. A semiconductor package structure includes a first electronic component and a light emitter. The photonic component includes a substrate and a first port. The light emitter is disposed over the substrate of the photonic component. The light emitter is configured to emit light through the first port. A coupling loss between the first port of the photonic component and the light emitter is less than 3 dB.

20 Claims, 11 Drawing Sheets

SEMICONDUCTOR PACKAGE STRUCTURE AND METHOD OF MANUFACTURING THE SAME

BACKGROUND

1. Field of the Disclosure

The present disclosure relates to semiconductor package structures and methods of manufacturing the same.

2. Description of Related Art

As semiconductor package structures are scaled down, the thickness of the substrate becomes much thinner (e.g., less than 100 μm). A carrier is used to support the thinned substrate through an adhesive material when a component is bonded to the substrate. The adhesive material may collapse due to high temperature in bonding the component, and thus the yield and reliability is deteriorated.

SUMMARY

According to some embodiments of the present disclosure, a semiconductor package structure includes a first electronic component and a light emitter. The photonic component includes a substrate and a first port. The light emitter is disposed over the substrate of the photonic component. The light emitter is configured to emit light through the first port. A coupling loss between the first port of the photonic component and the light emitter is less than 3 dB.

According to some embodiments of the present disclosure, a method of manufacturing a semiconductor package structure includes: providing a photonic component including a substrate; providing a carrier; attaching the substrate of the photonic component to the carrier through an adhesive material; and performing a first heat operation on the adhesive material, wherein a highest temperature of the adhesive material in the first heat operation is less than a glass transition temperature of the adhesive material.

BRIEF DESCRIPTION OF THE DRAWINGS

Aspects of the present disclosure are readily understood from the following detailed description when read with the accompanying figures. It should be noted that various features may not be drawn to scale. In fact, the dimensions of the various features may be arbitrarily increased or reduced for clarity of discussion.

Figure 1A:
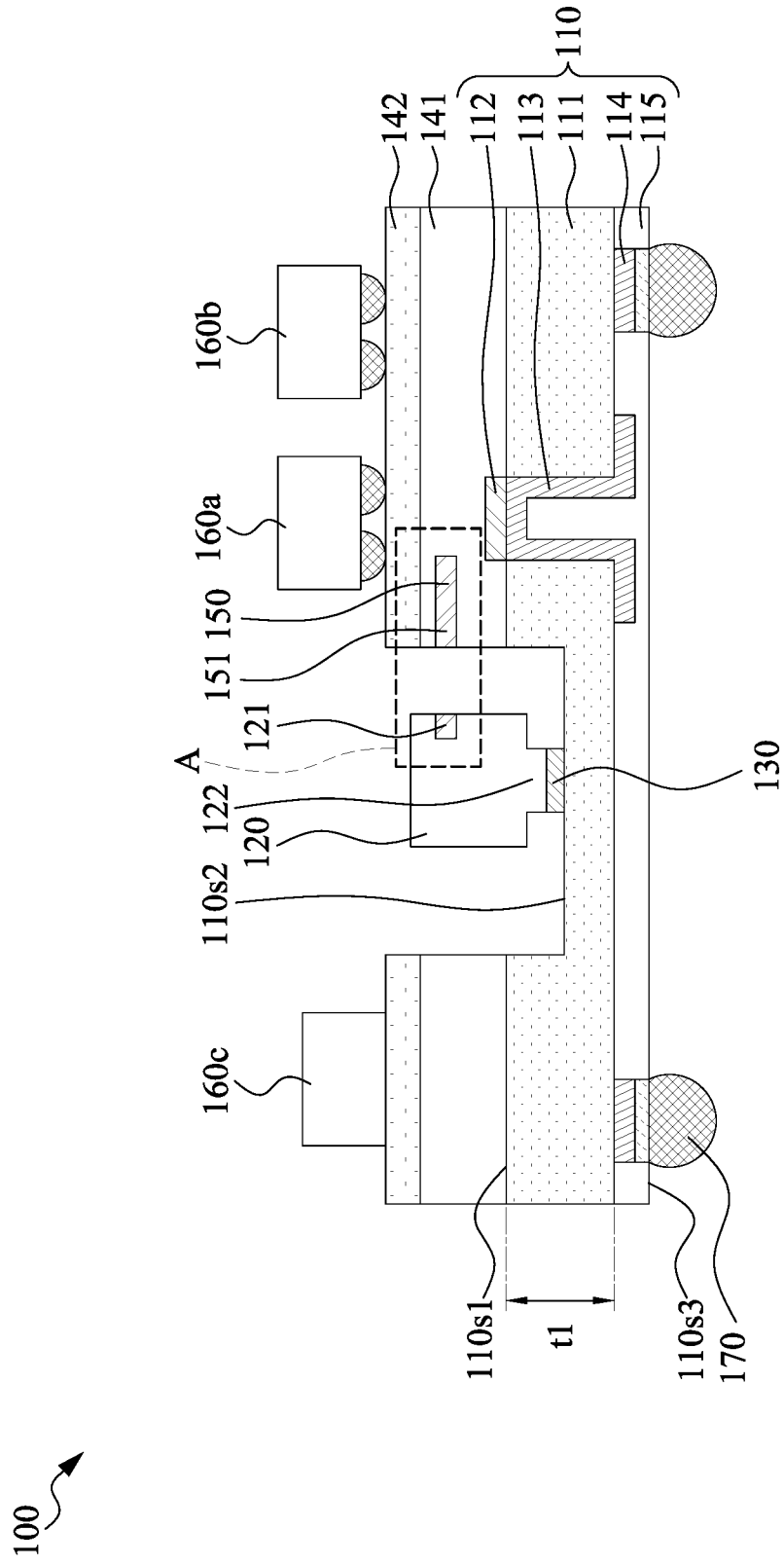
FIG. 1A is a cross-sectional view of a semiconductor package structure in accordance with some embodiments of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

The following disclosure provides for many different embodiments, or examples, for implementing different features of the provided subject matter. Specific examples of components and arrangements are described below. These are, of course, merely examples and are not intended to be limiting. In the present disclosure, reference to the formation or disposal of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

FIG. 1A is a cross-sectional view of a semiconductor package structure 100 in accordance with some embodiments of the present disclosure. In some embodiments, the semiconductor package structure 100 may include an photonic component 110 and a light emitter 120.

In some embodiments, the photonic component 110 can be configured to process, receive, and/or transmit optical signals. In some embodiments, the photonic component 110 can convert the optical signals to electric signals. For example, the photonic component 110 can include, but is not limited to, a photonic integrated circuit (PIC). The photonic component 110 may include a surface 110s1 and a surface 110s2. The surface 110s1 and the surface 110s2 may be at different heights. The surface 110s1 may be higher than the surface 110s2. The surface 110s1 and the surface 110s2 of the photonic component 110 may define a recess for accommodating the light emitter 120. The photonic component 110 may include a surface 110s3 opposite to the surface 110s1. The surface 110s3 may also be referred to as a backside surface.

In some embodiments, the photonic component 110 may include a substrate 111. The substrate 111 may include a semiconductor substrate. The substrate 111 may include silicon or germanium in a single crystal form, a polycrystalline form, or an amorphous form. The surface 110s1 and the surface 110s3 may be located on different sides of the substrate 111. The surface 110s1 and the surface 110s2 may be located on a same side of the substrate 111. In some embodiments, the photonic component 110 may have a thickness t1 greater than 0 and equal to or less than 100 μm, such as 10 μm, 20 μm, 30 μm, 40 μm, 50 μm, 60 μm, 70 μm, 80 μm, 90 μm or 100 μm. In some embodiments, the substrate 111 may be light transmissive. In some embodiments, the substrate 111 may be light transmissive with light of wavelength from about 100 nm to about 1000 nm, such as 100 nm, 200 nm, 300 nm, 400 nm, 500 nm, 60 nm, 700 nm, 800 nm, 900 nm or 1000 nm. In some embodiments, the light transmittance of the substrate 111 with respect to light may be equal to or greater than 90%, such as 90%, 93%, 95%, 97% or 99%.

In some embodiments, the photonic component 110 may include an etching stop layer 112. The etching stop layer 112 may be disposed on the substrate 111. The etching stop layer 112 may be disposed on the surface 110s1 of the photonic component 110. The etching stop layer 112 may be used to assist in forming a conductive via (e.g., conductive via 113). The materials of the etching stop layer 112 and the substrate 111 have distinct etching selectivity. By way of examples, the etching stop layer 112 may include electrical conductive materials, such as metal or other suitable materials.

In some embodiments, the photonic component 110 may include a conductive via 113. The conductive via 113 may be configured to electrically connect the etching stop layer 112 and terminals (such as conductive terminals 170). The conductive via 113 may include, for example, a through-silicon via (TSV). The conductive via 113 may extend between the surface 110s1 and the surface 110s3. The conductive via 113 may penetrate the substrate 111 of the electronic components 110. The conductive via 113 may include copper, tin, aluminum, gold, silver, tungsten, nickel or other suitable materials. In order to form the conductive via 113 with a suitable aspect ratio, the thickness t1 of the substrate 111 may be equal to or less than 100 μm.

In some embodiments, the photonic component 110 may include a circuit layer 114. The circuit layer 114 may be disposed adjacent to the surface 110s3 of the photonic component 110. The circuit layer 114 may be electrically connected to the etching stop layer 112 through the conductive via 113. In some embodiments, the circuit layer 114 may include a redistribution layer (RDL), which includes dielectric layer(s), and trace(s) and via(s) embedded therein.

In some embodiments, the photonic component 110 may include a dielectric layer 115. A portion of the circuit layer 114 may be exposed by the dielectric layer 115. Since the thickness of the dielectric layer 115 is relatively small in comparison with that of the substrate 111, the lower surface of the substrate 111 may be defined as the surface 110s3 of the photonic component 110.

The photonic component 110 may include an active element (not shown). The active elements may include, but are not limited to, diodes, field effect transistors (FETs), metal-oxide-semiconductor FETs (MOSFETs), complementary metal-oxide-semiconductor (CMOS) transistors, and bipolar transistors.

In some embodiments, the light emitter 120 may be disposed on the substrate 111. In some embodiments, the light emitter 120 may be disposed on the surface 110s2 of the photonic component 110. The light emitter 120 is configured to provide an optical signal to the photonic component 110. For example, the light emitter 120 may provide light such as visible light or invisible light, to the photonic component 110. The photonic component 110 may receive the light emitted from the light emitter 120, and convert the light into an electrical signal. The light emitter 120 may include, for example, a laser diode or other light emitters. The light emitter 120 may include a protruding portion 122.

In some embodiments, the semiconductor package structure 100 may further include a bonding layer 130 (or a bonding material). The bonding layer 130 is configured to connect the photonic component 110 and the light emitter 120. In some embodiments, the bonding layer 130 may be disposed between the photonic component 110 and the light emitter 120. In some embodiments, the bonding layer 130 is formed from a material curable or reflowable by light arriving at the bonding layer 130, and the light emitter 120 is bonded to the photonic component 110 through the bonding layer 130. In some embodiments, the bonding layer 130 includes a soldering material such as metal, alloy or other suitable materials. In some embodiments, the bonding layer 130 may include an alloy of gold and tin. In some embodiments, the protruding portion 122 of the light emitter 120 may be in contact with the bonding layer 130.

In some embodiments, the semiconductor package structure 100 may further include an oxide layer 141 such as a silicon oxide layer. The oxide layer 141 may be disposed on the substrate 111. The oxide layer 141 may include a cladding layer of the waveguide 150. In some embodiments, the oxide layer 141 may be replaced by other suitable materials.

In some embodiments, the semiconductor package structure 100 may further include a redistribution structure 142. The redistribution structure 142 is disposed on the oxide layer 141. The redistribution structure 142 may be configured to electrically connect different electronic components. The redistribution structure 142 may be electrically connected to the circuit layer 114 through the etching stop layer 112 and the conductive via 113 of the photonic component 110.

In some embodiments, the semiconductor package structure 100 may further include a waveguide 150. In some embodiments, the waveguide 150 may be configured to transmit light. For example, the waveguide 150 may be configured to transmit light emitted from the light emitter 120 to other electronic and/or optical components, such as the photonic component 110 or a photodiode. In some embodiments, the waveguide 150 may be embedded in the oxide layer 141. In some embodiments, a port 151 of the waveguide 150 may be exposed by the oxide layer 141. The port 151 may serve as a terminal of the waveguide 150. In some embodiments, the light emitter 120 may include a port 121 (or light exit), from which light may be emitted. In some embodiments, the port 121 may be at least partially aligned to the port 151 of the waveguide 150.

In some embodiments, the semiconductor package structure 100 may further include electronic components 160a, 160b and 160c. The electronic components 160a, 160b and/or 160c may include active components and/or passive components. For example, the electronic components 160a, 160b and/or 160c may include an electronic integrated circuit (EIC), which may be configured to process, receive, and/or transmit electrical signals from other electronic components, such as the photonic component 110. The electronic components 160a, 160b and 160c may include a transceiver including a physical-layer circuit or a physical-layer interface portion (normally abbreviated as "PHY"), which connects a physical medium through which data is conveyed to and from the electronic components 160a, 160b and 160c. In some arrangements, the electronic components 160a, 160b and 160c may include a Serializer-Deserializer (SERDES) die. The SERDES die may be used in high speed communications to convert data between serial data and parallel interfaces in order to minimize the number of I/O pins and interconnects. The electronic components 160a, 160b and/or 160c may be coupled to the photonic component 110. For example, the electronic components 160a, 160b and/or 160c may be configured to receive the electrical signal from the photonic component 110. In some embodiments, the electronic components 160a, 160b and/or 160c may be electrically connected to the conductive via 113 of the photonic component 110.

In some embodiments, the semiconductor package structure 100 may further include conductive terminals 170. The conductive terminal 170 may be configured to electrically connect the semiconductor package structure 100 and other electronic components (not shown). The conductive terminal 170 can include a solder ball (e.g., Sn ball).

Figure 1B:
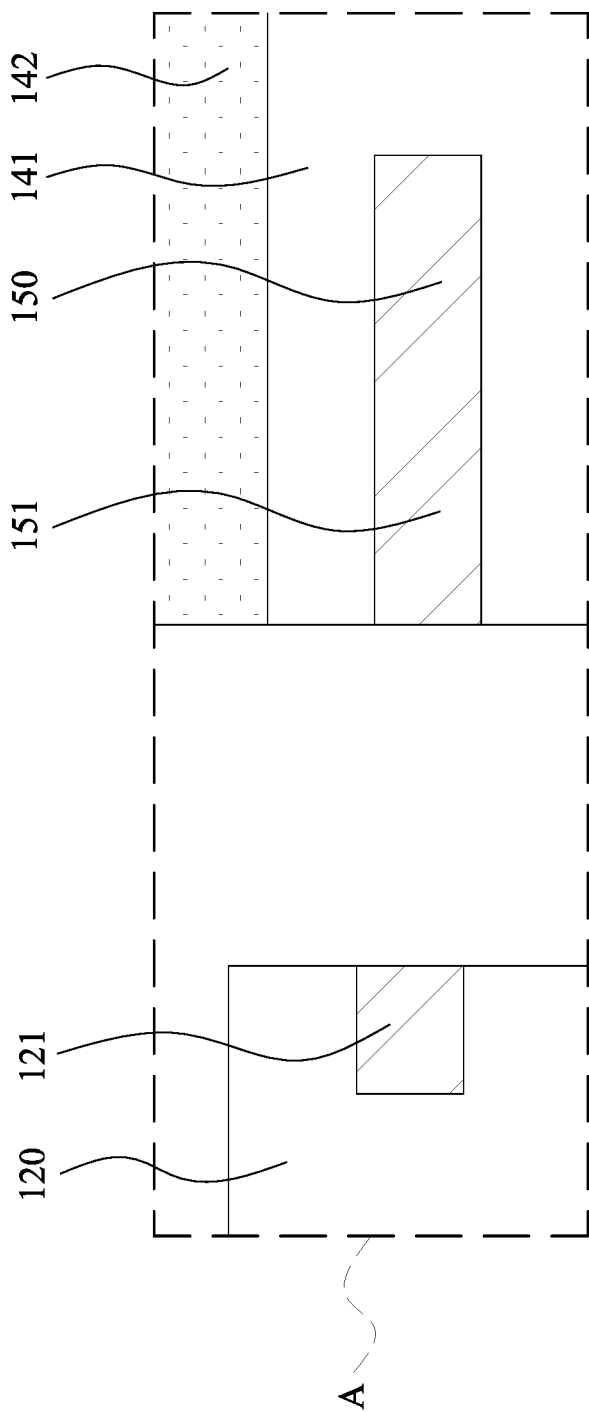
FIG. 1B is a partial enlarged view of region A of the semiconductor package structure shown in FIG. 1A in accordance with some embodiments of the present disclosure.

FIG. 1B is a partial enlarged view of region A of the semiconductor package structure shown in FIG. 1A in accordance with some embodiments of the present disclosure.

In some embodiments, the port 121 of the light emitter 120 and the port 151 of the waveguide 150 have an alignment offset along, for example, a vertical direction or a horizontal direction. That is, the port 121 of the light emitter 120 may be at least partially misaligned to the port 151 of the waveguide 150, which may cause a coupling loss.

Figure 2:
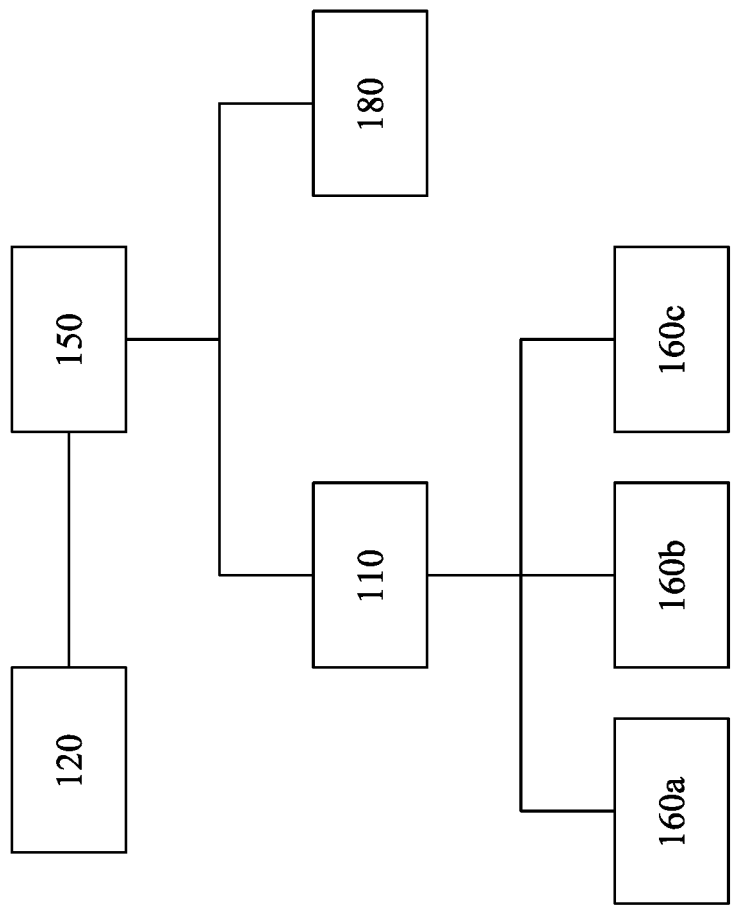
FIG. 2 is a schematic view illustrating the connections between different components in accordance with some embodiments of the present disclosure.

FIG. 2 is a schematic view illustrating the coupling between different components in accordance with some embodiments of the present disclosure.

In some embodiments, the semiconductor package structure 100 may further include a photo detector 180. In some embodiments, the photo detector 180 may be configured to detect a photocurrent. In some embodiments, the photo detector 180 may be configured to detect an information for calculating the coupling loss, from the optical signal to the electrical signal, due to the alignment offset. The information may include, but is not limited to, photocurrent. In some embodiments, the photo detector 180 is coupled to the waveguide 150. The photo detector 180 may receive the light transmitted by the waveguide 150. In some embodiments, the photo detector 180 may include photodiodes, photo transistors or other suitable photo detectors.

In some embodiments, the waveguide 150 may receive light emitted from the light emitter 120, and transmit the light to the photonic component 110 and the photo detector 180. For example, the photonic component 110 may receive the light greater than 95%, such as 95%, 96%, 97%, 98%, 99%, 99.5%, 99.9% or more, while the photo detector 180 may receive the light less than 5%, such as 5%, 4%, 3%, 2%, 1%, 0.5%, 0.1% or less. Alignment offset (e.g., Z shift) between the port 121 of the light emitter 120 and the waveguide 150 may affect the coupling loss from the optical signal to the electrical signal, and the photo detector 180 may be used to detect the degree of the alignment offset. In some embodiments, the coupling loss from the optical signal to the electric signal of the semiconductor package structure 100 is less than about 3 dB, such as 3 dB, 2.5 dB, 2 dB, 1.5 dB, 1 dB or less. The coupling loss may be calculated with equation (1), as follows:

$$-C = 10 \times \log(R \times P \times S/I)$$

C in equation (1) is coupling loss (unit: dB), R in equation (1) is photo responsivity (unit: A/W), P in equation (1) is photocurrent detected by the photo detector 180 (unit: A), S in equation (1) is the ratio of light that the photo detector 180 receives, and I in equation (1) is power of light emitted by the light emitter 120 (unit: W).

In some embodiments, the power of light emitted by the light emitter 120 is 60 mW, the ratio of light the photo detector 180 receives is 1%, the photocurrent detected by the photo detector 180 is 255 µA, photo responsivity is 0.85 mA/mW. In such a condition, the coupling loss of the semiconductor package structure 100 is about 3 dB. When the coupling loss is equal to or less than about 3 dB, it means that the degree of the alignment offset between the light emitter 120 and the waveguide 150 is relatively small. In some embodiments, the photocurrent detected by the photo detector 180 may range from about 250 µA to about 1000 µA, such as 250 µA, 350 µA, 450 µA, 550 µA, 650 µA, 750 µA, 850 µA, 950 µA or 1000 µA. In some embodiments, the photocurrent detected by the photo detector 180 may be equal to or greater than 250 µA. As shown in FIG. 2, the photonic component 110 may be coupled to the electronic components 160a, 160b and 160c, respectively.

Figure 3:
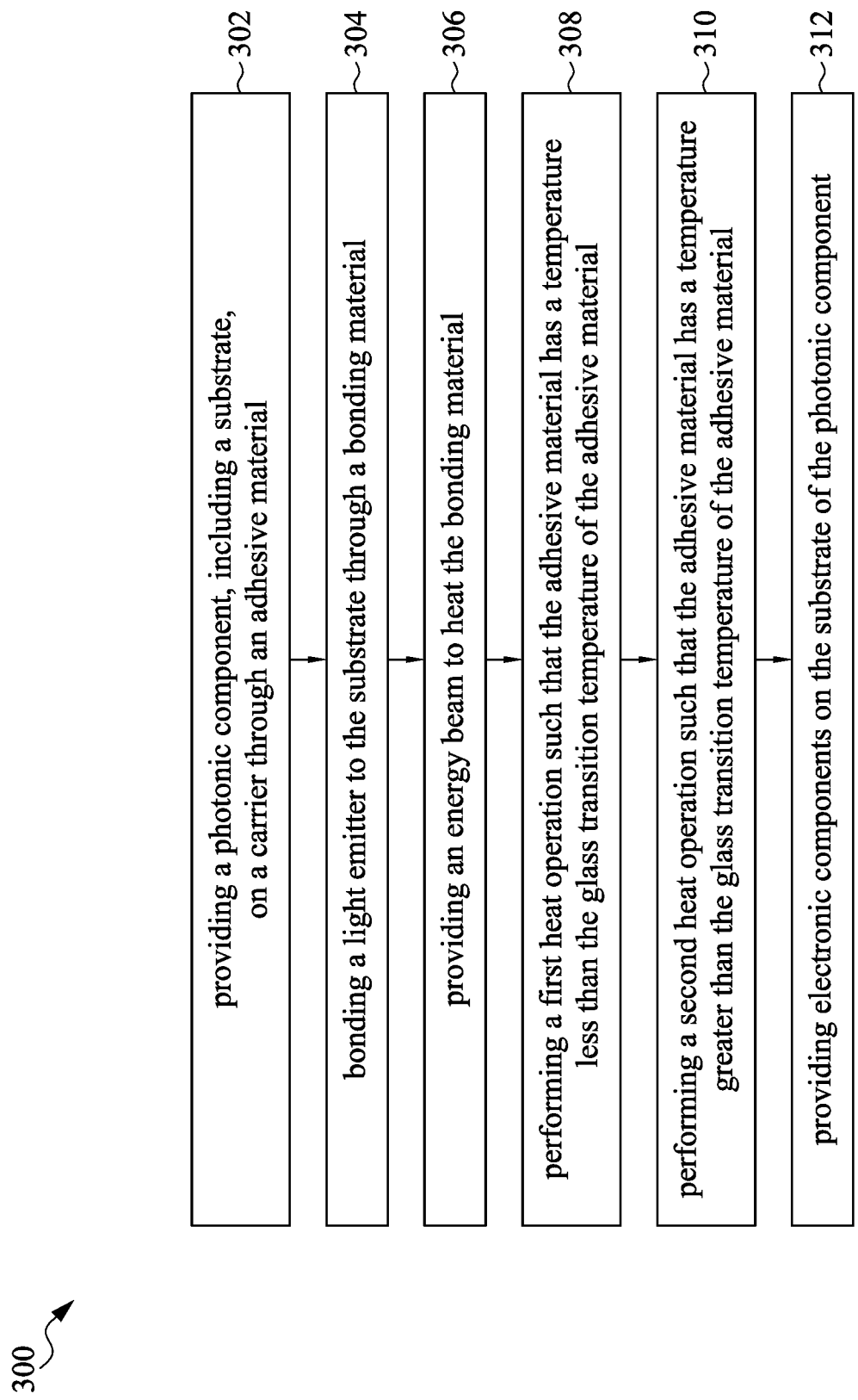
FIG. 3 is a flow chart illustrating a method for manufacturing a semiconductor device according to various aspects of the present disclosure.

FIG. 3 is a flow chart illustrating a method 300 for manufacturing a semiconductor device according to various aspects of the present disclosure.

The method 300 begins with operation 302 in which a photonic component, such as a PIC, is provided on a carrier through an adhesive material, wherein the photonic component may include a substrate. The method 300 continues with operation 304 in which a light emitter, such as a laser diode, is bonded to the substrate of the photonic component through a bonding material. The method 300 continues with operation 306 in which an energy beam, such as light, is provided to heat the bonding material. The method 300 continues with operation 308 in which a first heat operation is performed such that the adhesive material has a temperature less than the glass transition temperature of the adhesive material. The method 300 continues with operation 310 in which the second heat operation is performed to heat the bonding material such that the adhesive material has a temperature greater than the glass transition temperature of the adhesive material, and thus the bonding material is cured, becoming a bonding layer. The method 300 continues with operation 312 in which electronic components, including the EIC and passive components, are formed on the substrate to produce a semiconductor package structure.

The method 300 is merely an example, and is not intended to limit the present disclosure beyond what is explicitly recited in the claims. Additional operations can be provided before, during, and after the method 300, and some operations described can be replaced, eliminated, or moved around for additional embodiments of the method.

FIG. 4A, FIG. 4B, FIG. 4C, FIG. 4D, FIG. 4E, and FIG. 4F illustrate various stages of a method for manufacturing a semiconductor package structure in accordance with some embodiments of the present disclosure.

Figure 4A:
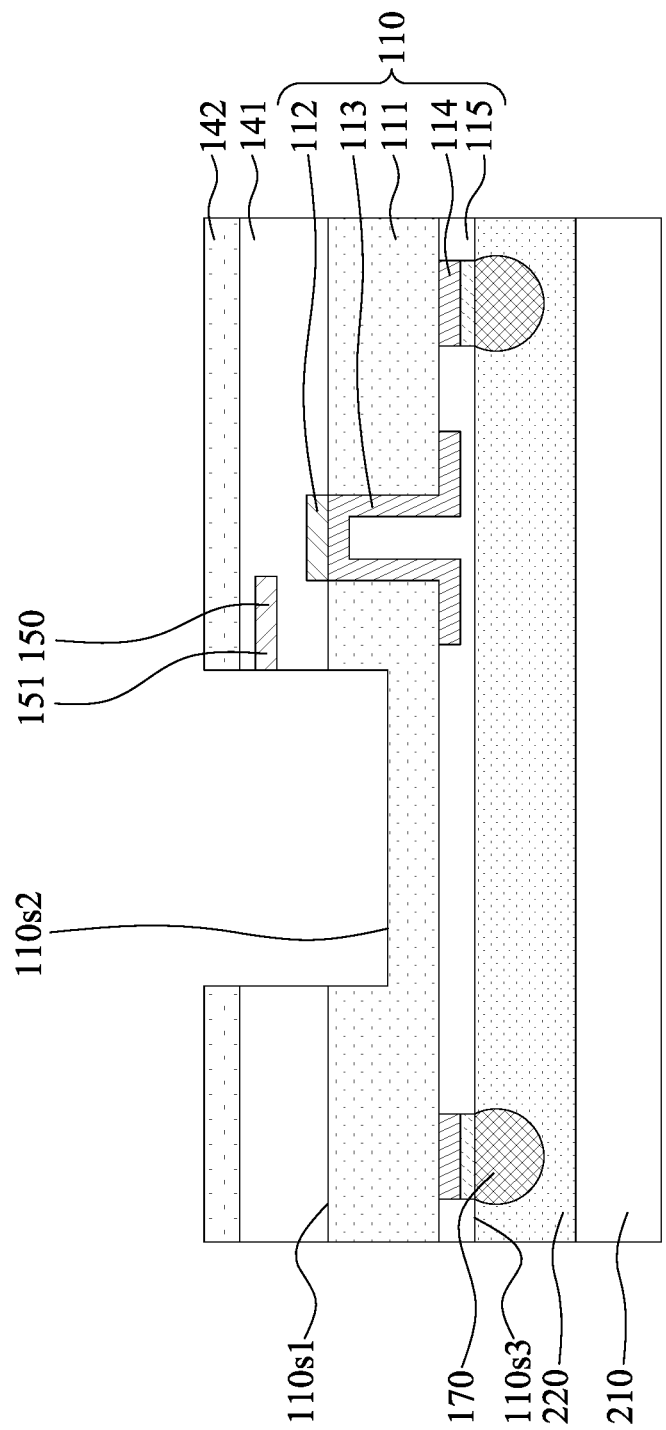
FIG. 4A, FIG. 4B, FIG. 4C, FIG. 4D, FIG. 4E, and FIG. 4F illustrate various stages of a method for manufacturing a semiconductor package structure in accordance with some embodiments of the present disclosure.

Referring to FIG. 4A, an photonic component 110 is provided. The photonic component 110 may have a surface 110s1, a surface 110s2 and a surface 110s3. The photonic component 110 may include a substrate 111, an etching stop layer 112, a conductive via 113, a circuit layer 114 and a dielectric layer 115. An oxide layer 141 and a redistribution structure 142 may be formed on the surface 110s1 of the photonic component 110. A waveguide 150 may be formed in the oxide layer 141. Conductive terminals 170 may be formed on the surface 110s3 of the photonic component 110. Further, a carrier 210 is provided. The carrier 210 may be configured to support the photonic component 110, and will be removed in the subsequent stages. The carrier 210 may be a glass carrier, wafer, ceramic carrier or other carriers. In some embodiments, an adhesive material 220 may be formed on the carrier 210. In some embodiments, the adhesive material 220 may serve as an adhesive to attach the photonic component 110 to the carrier 210. In some embodiments, the adhesive material 220 may be configured to transmit heat. The adhesive material 220 may be in contact with the surface 110s3 of the photonic component 110. The adhesive material 220 may be in contact with the region of the substrate 111 that the energy beam illuminates. In some embodiments, before attaching the photonic component 110 to the carrier 210, the photonic component 110 may be thinned such that the substrate 111 of the photonic component 110 may have a thickness greater than 0 and equal to or less than 100 μm. In some embodiments, the adhesive material 220 may include a release layer, a bonding glue layer and/or other suitable layers. The release layer may include, but is not limited to, fluorine-containing materials. The bonding glue layer may include, but is not limited to, polymer-based layer.

Figure 4B:
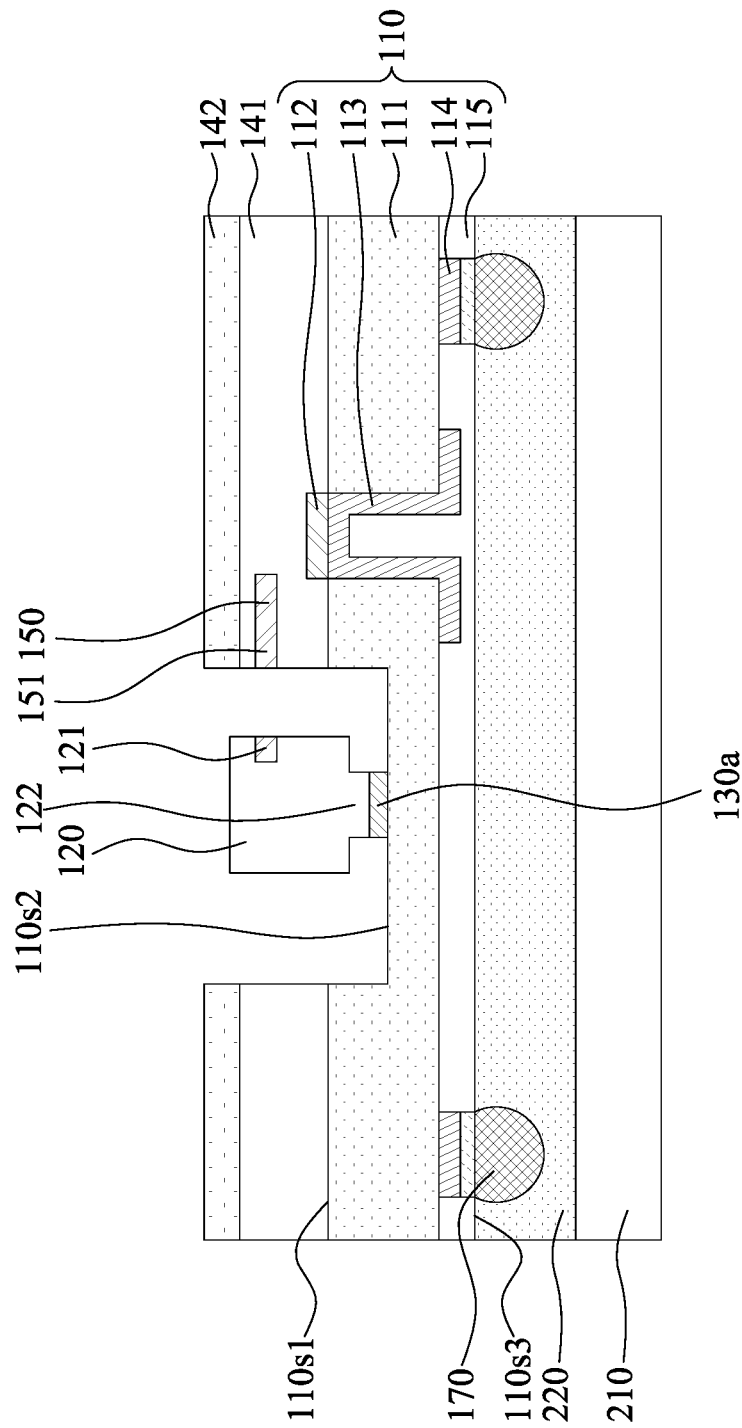

Referring to FIG. 4B, a light emitter 120 is bonded to the surface 110s2 of the photonic component 110 through a bonding material 130a. The bonding material 130a may be configured to connect the photonic component 110 and the light emitter 120. In some embodiments, the bonding material 130a is curable or reflowable by an energy beam, such as light, arriving at the bonding material 130a. In some embodiments, the bonding material 130a may include a soldering material with adhesive property such as metal, alloy or other suitable materials. By way of an example, the soldering material may include Au/Sn alloy. In some embodiments, a force or stress may be imposed on the light emitter 120. Since the thinned photonic component 110 has a relatively small thickness, the adhesive material 220 may support photonic component 110 and further prevent the photonic component 110 from being broken when imposing a force or stress on the light emitter 120.

Figure 4C:
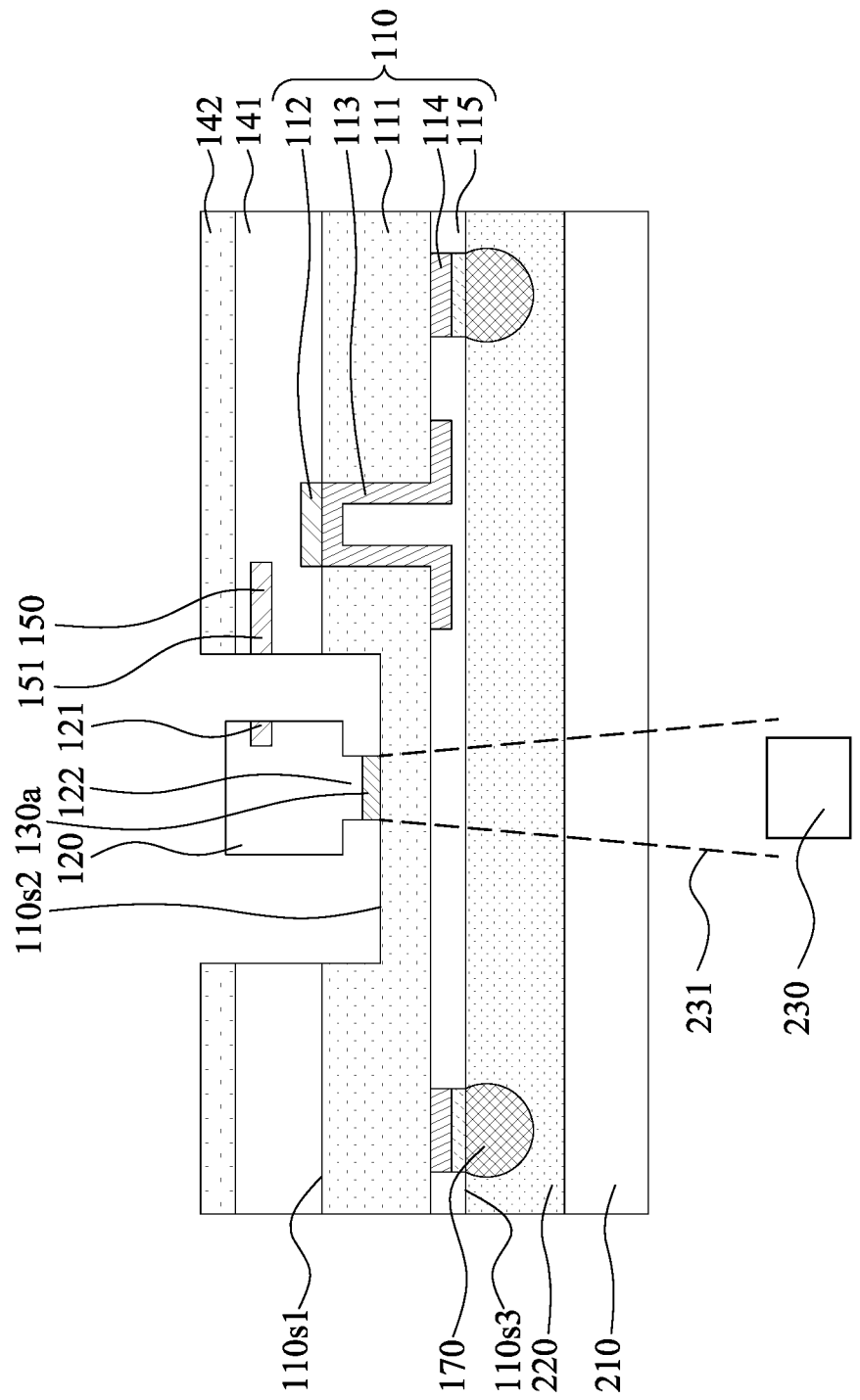

Referring to FIG. 4C, a heat source 230 is provided, and a first heat operation may be performed. The heat source 230 may provide heat to assist in curing the bonding material 130a. For example, the heat source 230 may provide an energy beam 231, such as light. The energy beam 231 may illuminate the bonding material 130. The energy beam 231 may irradiate through the carrier 210 and the adhesive material 220. In some embodiments, the substrate 111 is transmissive to the energy beam 231 such that the energy beam 231 may penetrate the substrate 111. In some embodiments, the energy beam 231 may include infrared light, and the substrate 111 may include silicon. Thus, the heat may be provided to heat the bonding material 130. During or after the first heat operation, the adhesive material 220 may have a first temperature. In some embodiments, the first temperature may be less than the glass transition temperature of the adhesive material 220.

Figure 4D:
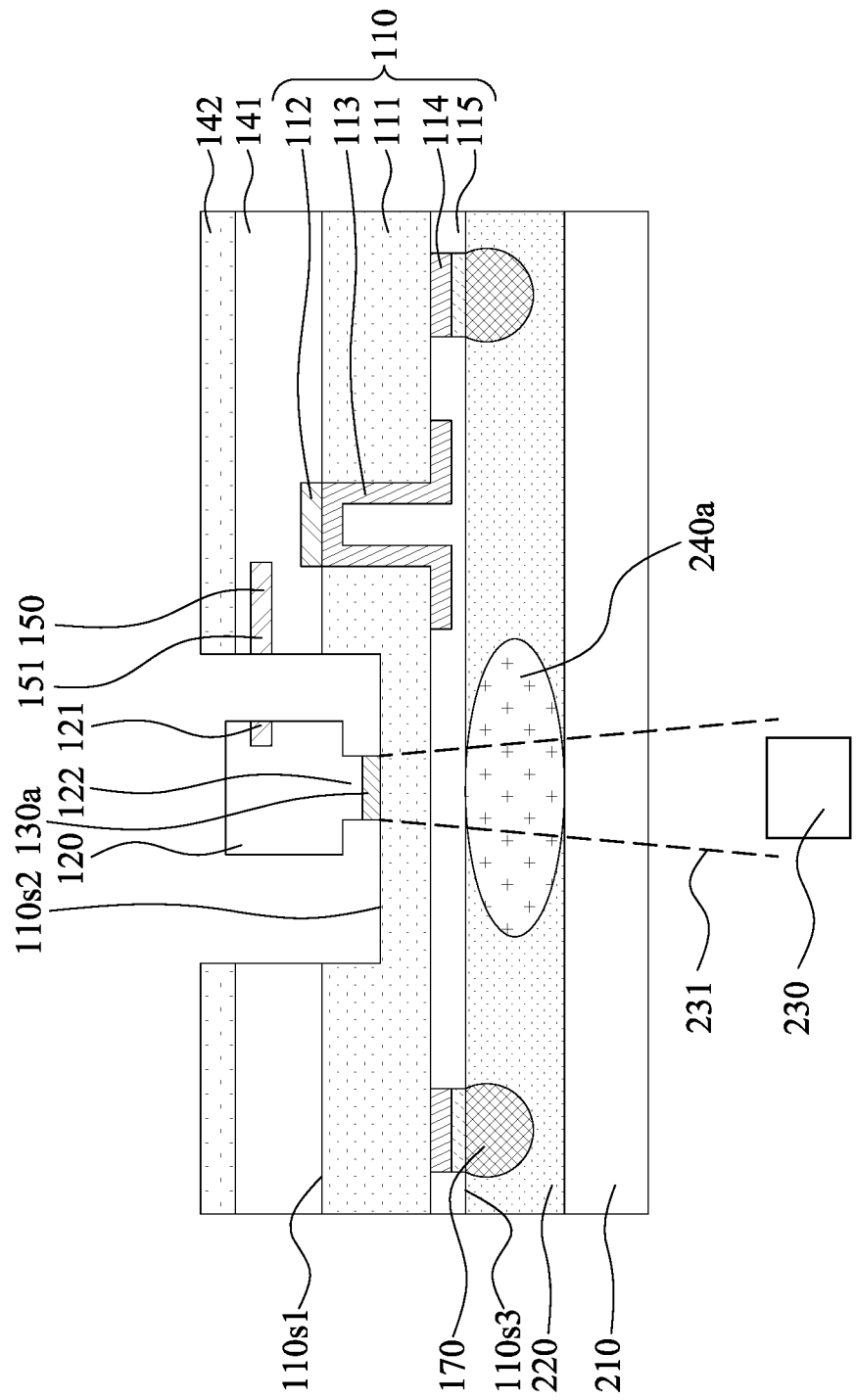

Referring to FIG. 4D, during or after the first heat operation, a thermal conductive medium 240a (or a void) may be generated. When the energy beam 231 illuminates the bonding material 130, a portion of heat may be to the adhesive material 220. The heat may deform the adhesive material 220, and thus the thermal conductive medium 240a may be formed within the adhesive material 220. The thermal conductive medium 240a may extend between the photonic component 110 and the carrier 210. The thermal conductive medium 240a may be in contact with the surface 110s3 of the photonic component 110. In some embodiments, the thermal conductive medium 240a may hinder the heat transmitted from the photonic component 110 to the adhesive material 220, which may enhance the efficiency of curing the bonding material 130a. In some embodiments, the thermal conductive medium 240a may prohibit heat from being transmitted back to the adhesive material 220. The thermal conductivity of the thermal conductive medium 240a may be different from that of the adhesive material 220. In some embodiments, the thermal conductive medium 240a may have a thermal conductivity less than that of adhesive material 220. The thermal conductive medium 240a may include gas, for example, air or other suitable materials. In some embodiments, the formation of the thermal conductive medium 240a may cause the deformation of the adhesive material 220.

Figure 4E:
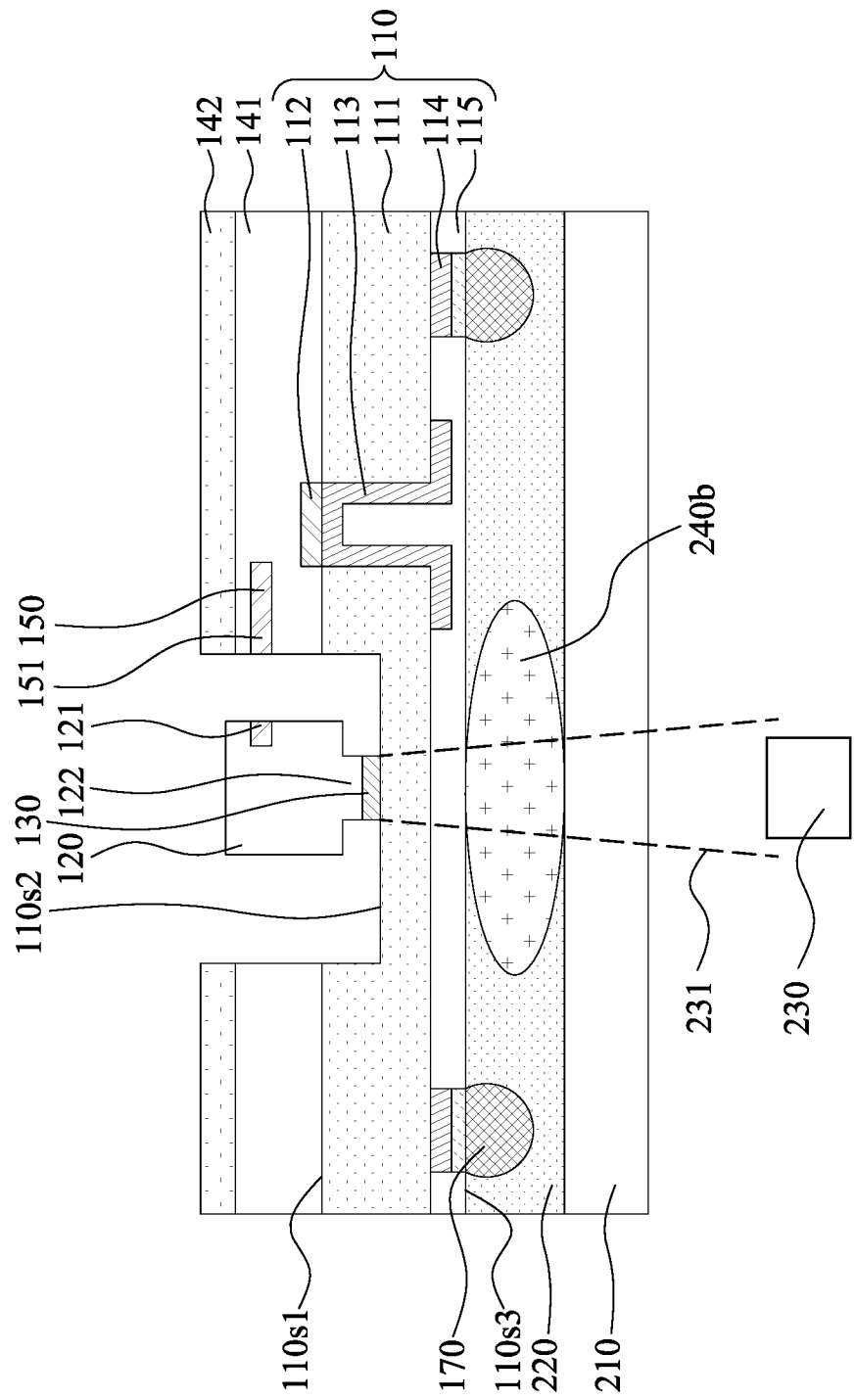

Referring to FIG. 4E, a second heat operation may be performed. During or after the second heat operation, the bonding material 130a may has a second temperature greater than the first temperature. In some embodiments, the second temperature is greater than the glass transition temperature of the adhesive material 220. During or after the second heat operation, the bonding material 130a may be cured and the bonding layer 130 is formed. During or after the second heat operation, the thermal conductive medium 240a is enlarged and becomes a thermal conductive medium 240b (or a void). Since the thermal conductive medium 240b is larger than the thermal conductive medium 240a, the deformation of the adhesive material 220 becomes greater in this stage, which may cause an alignment offset between the light emitter 120 and the waveguide 150.

Figure 5:
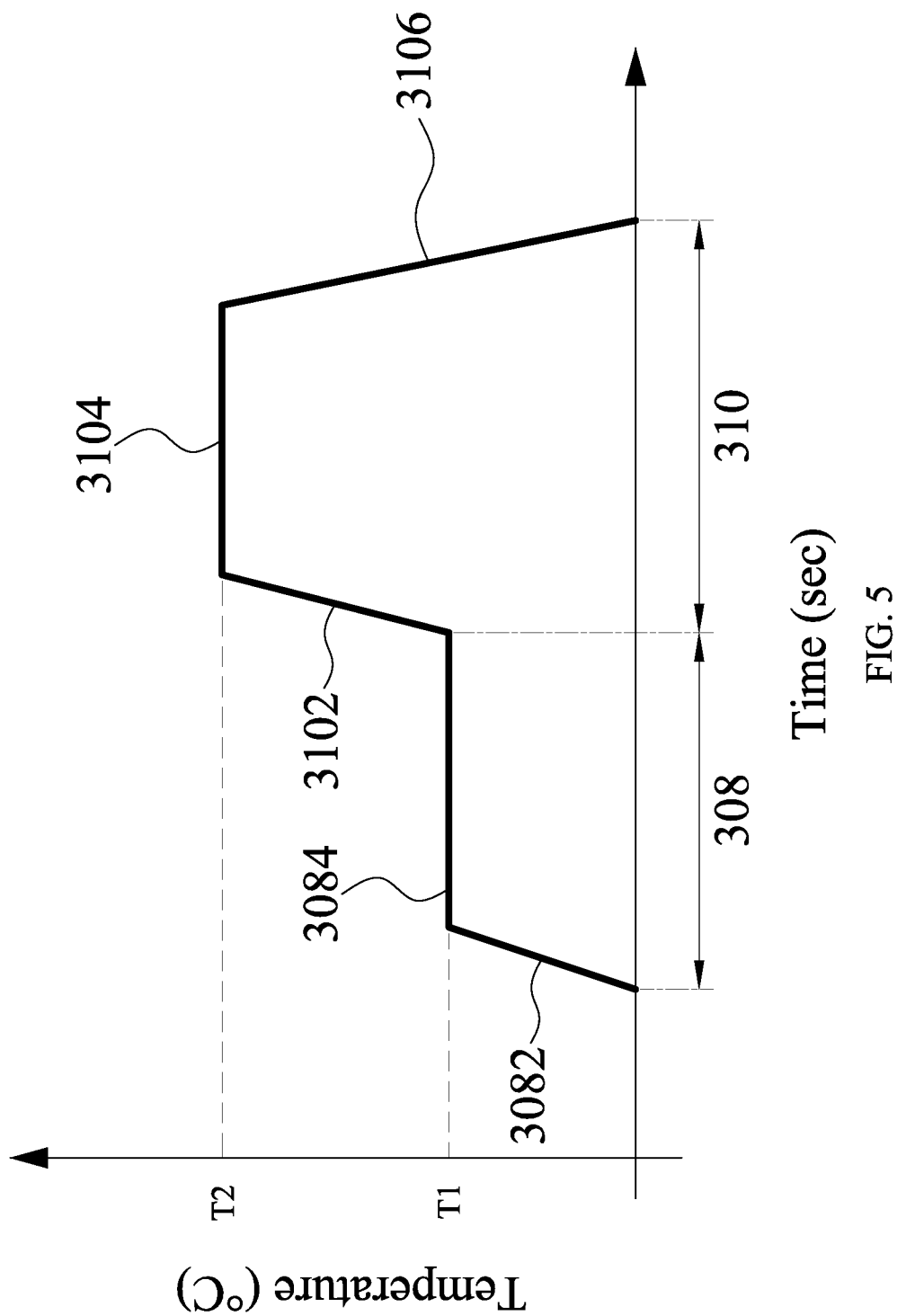
FIG. 5 is a chart illustrating temperatures in a first heat operation and a second heat operation.

Please refer to FIG. 5, which illustrates temperatures of the adhesive material 220 (or the substrate 111 of the photonic component 110) during the first heat operation and the second heat operation, which may correspond to operations 308 and 310 shown in FIG. 3. As shown in FIG. 5, first temperature T1 may be less than second temperature T2. In some embodiments, first temperature T1 ranges from about 0.3 times to about 0.8 times of second temperature T2, such as 0.3 times, 0.4 times, 0.5 times, 0.6 times, 0.7 times or 0.8 times. In some embodiments, first temperature T1 ranges from about 0.5 times to about 0.8 times of the glass transition temperature of the adhesive material 220, such as 0.5 times, 0.6 times, 0.7 times or 0.8 times. In some embodiments, second temperature T2 ranges from about 1.01 times to about 1.4 times of the glass transition temperature of the adhesive material 220, such as 1.01 times, 1.1 times, 1.2 times, 1.3 times or 1.4 times. The first heat operation may be performed at a first time period, which may range from about 10 seconds to about 600 seconds. During the first heat operation, the highest temperature of the adhesive material 220 is less than the glass transition temperature of the adhesive material 220, and the highest temperature of the adhesive material 220 in the first operation may be maintained within ±10° C., 7° C., 5° C., 3° C., 1° C., 0.5° C. or 0 for first time period. The first heat operation may include a ramp heating stage 3082 and a soak heating stage 3084. During the ramp heating stage 3082, the slope of the temperature with respect to time is steeper, and during the soak heating stage 3084, the slope of the temperature with respect to time is substantially flat. In some embodiments, the highest temperature of the first heat operation achieves a soak heating stage 3084 of the first heat operation. The soak heating stage 3084 may be configured to evaporate solvents (if any) in the bonding material 130a to outgas. The second heat operation may include a ramp heating stage 3102, a soak heating stage 3104 and a cooling stage 3106. During the ramp heating stage 3102, the slope of the temperature with respect to time is steeper, during the soak heating stage 3104, the slope of the temperature with respect to time is substantially flat, and during the cooling stage 3106, the slope of the temperature with respect to time is steeper. In some embodiments, the highest temperature of the second heat operation achieves a soak heating stage 3104 of the second heat operation.

The second heat operation may be performed at a second time period, which may range from about 10 seconds to about 600 seconds. During the second heat operation, the highest temperature of the adhesive material 220 is higher than the glass transition temperature of the adhesive material 220, and may be maintained for second time period, and the highest temperature of the adhesive material 220 in the second heat operation may be maintained within ±10° C., 7° C., 5° C., 3° C., 1° C., 0.5° C., or 0 for second time period. In some embodiments, a ratio between the first time period and the second time period ranges from about 7:3 to about 3:7. For example, the ratio between the first time period and the second time period may be 7:3, 6:4, 5:5, 4:6 or 3:7.

Figure 4F:
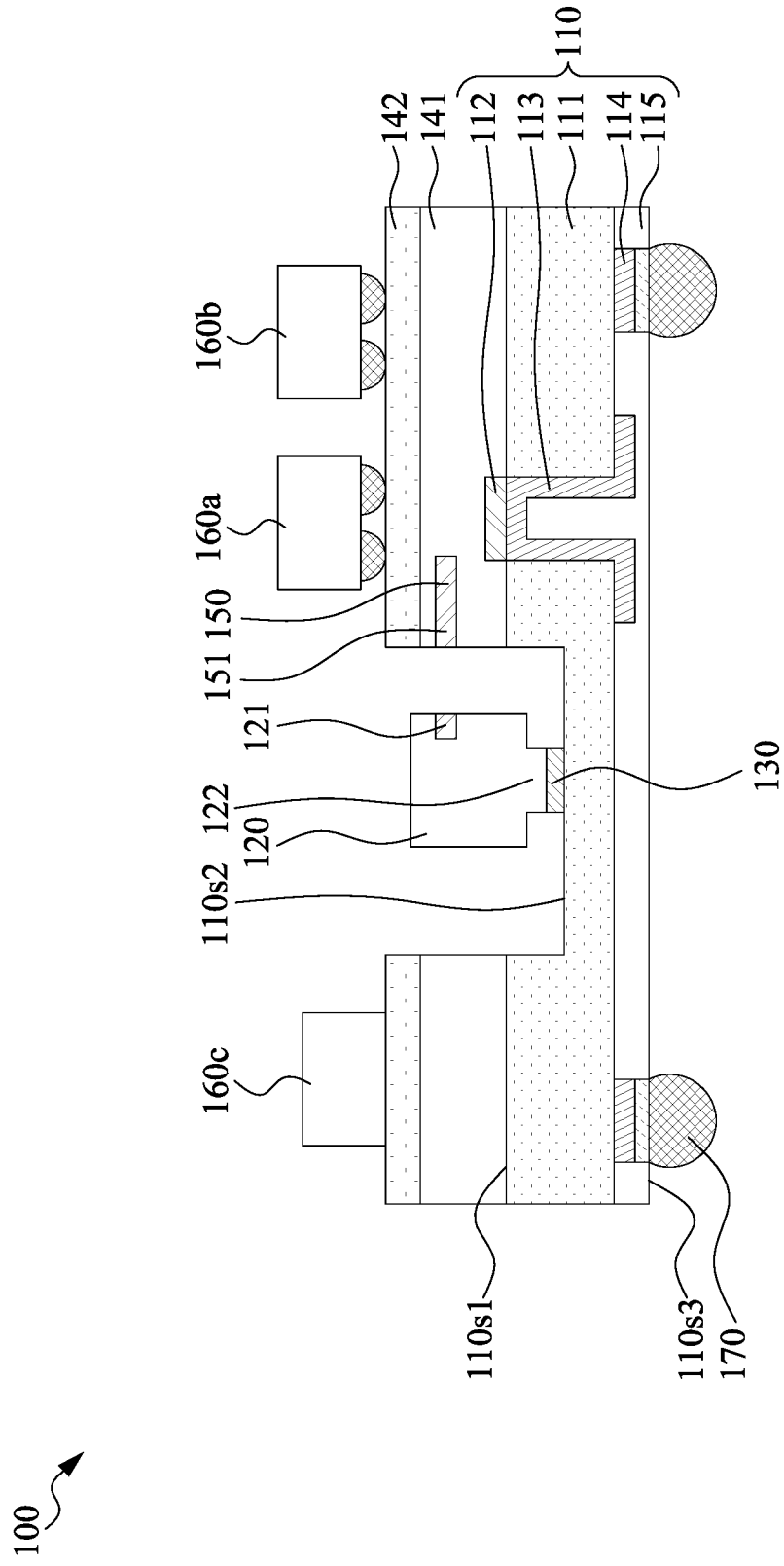

Referring to FIG. 4F, the carrier 210 and the adhesive material 220 are removed. Further, electronic components 160$a$, 160$b$ and 160$c$ may be formed on the surface 110$s$1 of the photonic component 110, and a semiconductor package structure 100 may be produced.

As depicted above, the thermal conductive medium 240$b$ is larger than the thermal conductive medium 240$a$. Therefore, the adhesive material 220 is deformed greatly in the second heat operation. When the adhesive material 220 is deformed, the photonic component 110 may tilt, which causes the alignment offset (e.g., Z shift) between the port 121 of the light emitter 120 and the port 151 of the waveguide 150, causing a greater coupling loss from the optical signal to the electric signal. In a comparative example, the bonding material is heated by one heat operation with a relatively high temperature whose temperature at the soak heating stage is greater than the glass transition temperature of the adhesive material). In such a condition, the bonding material is heated under a much deformed adhesive material with a greater time, causing a greater alignment offset between the light emitter and the waveguide. In this embodiment, the bonding material 130$a$ is cured by at least two steps with different temperatures. Therefore, the bonding material 130$a$ may stay at a relatively high temperature for a shorter time. That is, the bonding material 130$a$ may be heated under a greatly deformed adhesive material 220 for a shorter time. Therefore, the alignment offset between the port 121 of the light emitter 120 and the waveguide 150 is improved, thereby decreasing the coupling loss. Further, the thermal conductive medium 240$a$ or 240$b$ of the present disclosure may hinder heat transmitted back to the adhesive material 220, and may further save time for curing the bonding material 130$a$.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the term "vertical" is used to refer to these upward and downward directions, whereas the term "horizontal" refers to directions transverse to the vertical directions.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 µm, no greater than 2 µm, no greater than 1 µm, or no greater than 0.5 µm. A surface can be deemed to be substantially flat if a displacement between the highest point and the lowest point of the surface is no greater than 5 µm, no greater than 2 µm, no greater than 1 µm, or no greater than 0.5 µm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, subdivided, or reordered to form an equivalent method without departing from the teachings of the present disclosure. Accordingly, unless specifically indicated herein, the order and grouping of the operations are not limitations of the present disclosure.

What is claimed is:

1. A method for manufacturing a semiconductor package structure, comprising:
 providing a photonic component comprising a substrate;
 providing a carrier;
 attaching the substrate of the photonic component to the carrier through an adhesive material;
 attaching a light emitter to a top surface of the substrate through a bonding material; and
 performing a first heat operation on the adhesive material and the bonding material, wherein a highest temperature of the adhesive material in the first heat operation is less than a glass transition temperature of the adhesive material.

2. The method of claim 1, wherein the light emitter is a laser diode.

3. The method of claim 1, wherein the photonic component comprises a waveguide configured to receive a light emitted from the light emitter.

4. The method of claim 3, wherein attaching the substrate of the photonic component to the carrier comprises:
 inserting a plurality of conductive terminals, which are connected to a bottom surface, opposite to the top surface, of the substrate, into the adhesive material.

5. The method of claim 3, wherein attaching the light emitter to the substrate comprises:
 aligning a light exit of the light emitter to the waveguide.

6. The method of claim 1, further comprising:
 performing a second heat operation on the adhesive material and the bonding material; and
 imposing a force or stress on the light emitter.

7. The method of claim 6, wherein the adhesive material supports the photonic component and is configured to prevent the photonic component from being broken when imposing the force or stress on the light emitter.

8. The method of claim 1, wherein performing the first heat operation comprises:
 providing an energy beam to penetrate the substrate to heat the bonding material.

9. The method of claim 8, further comprising:
 curing the bonding material by the energy beam.

10. The method of claim 1, wherein the photonic component defines a recess, and the light emitter 120 is disposed within the recess.

11. The method of claim 1, further comprising:
 thinning the photonic component before attaching the substrate of the photonic component to the carrier.

12. The method of claim 1, wherein the first heat operation is performed after attaching the light emitter to the substrate.

13. The method of claim 1, wherein the first heat operation comprises:
 a heating stage configured to evaporate solvents in the bonding material to outgas.

14. The method of claim 1, further comprising:
 performing a second heat operation to cure the bonding material, wherein an operation temperature of the second heat operation is greater than a glass transition temperature of the adhesive material.

15. The method of claim 14, wherein the second heat operation comprises:
 a first heating stage after a second heating stage of the first heat operation, wherein a slope of a temperature with respect to a time of the first heating stage of the second heat operation is steeper than that of the second heating stage of the first heating operation.

16. The method of claim 15, wherein an initial temperature of the first heating stage of the second heat operation is substantially equal to a temperature of the second heating stage of the first heat operation.

17. The method of claim 16, wherein a highest temperature of the first heat operation ranges from about 0.3 times to about 0.8 times of a highest temperature of the second heat operation.

18. The method of claim 14, wherein the first heat operation is performed with a first time period, the second heat operation is performed with a second time period, and a ratio between the first time period and the second time period ranges from about 7:3 to about 3:7.

19. The method of claim 14, wherein the first heat operation comprises:
 a first heating stage and a second heating stage, wherein a temperature of the second heating stage is greater than or substantially equal to that of the first heating stage.

20. The method of claim 19, wherein the second heat operation comprises:
 a third heating stage, a fourth heating stage, and a cooling stage.

* * * * *